US005582902A

United States Patent [19]

Kanbayashi et al.

[11] Patent Number: 5,582,902

[45] Date of Patent: Dec. 10, 1996

[54] LAMINATE FILM FOR RECEIVING TONER IMAGE AND METHOD FOR FORMING FIXED TONER IMAGE ON LAMINATE FILM

[75] Inventors: Makoto Kanbayashi, Kawasaki; Takeshi Menjo, Tokyo; Takayuki Nagatsuka, Yokohama; Takashige Kasuya, Kawasaki; Tatsuya Nakamura; Tatsuhiko Chiba, both of Tokyo; Kohji Inaba, Yokohama, all of Japan

[73] Assignee: Canon Kabushiki Kaisha, Tokyo, Japan

[21] Appl. No.: 145,674

[22] Filed: Nov. 4, 1993

Related U.S. Application Data

[62] Division of Ser. No. 841,079, Feb. 25, 1992, Pat. No. 5,281,504.

[30] Foreign Application Priority Data

| | | | |
|---|---|---|---|
| Feb. 25, 1991 | [JP] | Japan | 3-050152 |
| Mar. 11, 1991 | [JP] | Japan | 3-070479 |
| Nov. 6, 1991 | [JP] | Japan | 3-289936 |

[51] Int. Cl.$^6$ .......... B32B 5/16

[52] U.S. Cl. .......... 428/206; 428/304.4; 428/323; 428/331; 428/411.1; 428/500; 428/522; 428/480; 346/135.1

[58] Field of Search .......... 428/195, 206, 428/212, 304.4, 323, 327, 331, 409, 411.1, 500, 515, 522, 480, 913, 914; 346/135.1

[56] References Cited

U.S. PATENT DOCUMENTS

| | | | |
|---|---|---|---|
| 4,245,025 | 1/1981 | Kato et al. | 430/126 |
| 4,770,934 | 9/1988 | Yamasaki et al. | 428/331 |
| 4,780,356 | 10/1988 | Otouma et al. | 428/212 |
| 5,068,140 | 11/1991 | Malhotra et al. | 428/216 |
| 5,143,812 | 9/1992 | Mori et al. | 430/124 |
| 5,169,468 | 12/1992 | Royce et al. | 156/234 |
| 5,229,188 | 7/1993 | Takeuchi et al. | 428/195 |
| 5,229,203 | 7/1993 | Sato | 428/327 |
| 5,244,714 | 9/1993 | Malhotra et al. | 428/195 |
| 5,275,867 | 1/1994 | Misuda et al. | 428/195 |
| 5,289,245 | 2/1994 | Menjo | 355/284 |
| 5,308,680 | 5/1994 | Desjarlais et al. | 428/195 |
| 5,320,898 | 6/1994 | Yoshida et al. | 428/195 |
| 5,354,634 | 10/1994 | Misuda et al. | 430/18 |

FOREIGN PATENT DOCUMENTS

| | | |
|---|---|---|
| 0349227 | 1/1990 | European Pat. Off. . |
| 36-10231 | 7/1961 | Japan . |
| 57-049954 | 3/1982 | Japan . |
| 57-066459 | 4/1982 | Japan . |
| 59-022794 | 2/1984 | Japan . |
| 61-062052 | 3/1986 | Japan . |
| 63-33749 | 2/1988 | Japan . |
| 2-276670 | 11/1990 | Japan . |

OTHER PUBLICATIONS

European Search Report.

*Primary Examiner*—Patrick Ryan
*Assistant Examiner*—Marie R. Yamnitzky
*Attorney, Agent, or Firm*—Fitzpatrick, Cella, Harper & Scinto

[57] ABSTRACT

A laminate film suitable for providing a transparency for an OHP (overhead projector) is formed by disposing an absorbing layer on a substrate. The absorbing layer functions to allow addition of a wax component to a toner so as to improve the color mixing characteristic and anti-offset characteristic of the toner without causing a wax exudation trace which is liable to occur in a fixed toner image if the absorbing layer is not provided.

60 Claims, 4 Drawing Sheets

LAMINATE FILM FOR RECEIVING TONER IMAGE AND METHOD FOR FORMING FIXED TONER IMAGE ON LAMINATE FILM

This application is a division of application Ser. No. 07/841,079 filed Feb. 25, 1992 (now U.S. Pat. No. 5,281,504).

FIELD OF THE INVENTION AND RELATED ART

The present invention relates to a laminate film for receiving a toner image and a method for forming a fixed toner image on a laminate film, particularly a laminate film for receiving a color or full-color toner image according to an electrophotographic system and a method for forming a fixed toner image of a color or full color on such a laminate film.

Conventionally, a full-color image has been formed generally in the following manner.

A photoconductive layer of a photosensitive drum as an electrostatic latent image holding member is uniformly charged by a primary charger and exposed imagewise to laser light modulated by a magenta image signal of an original to form an electrostatic latent image on the photosensitive drum. The drum is then developed with a magenta toner contained in a magenta developing unit to form a magenta toner image. The thus formed magenta toner image on the photosensitive drum is transferred by a transfer charger to a recording medium conveyed thereto.

On the other hand, the photosensitive drum after the transfer of the toner image to the recording medium is discharged (charge-removed) by a discharger, cleaned by a cleaning means and again charged by a primary charger, followed by similar formation of a cyan toner image and transfer of the cyan toner image to the recording member already carrying the above-mentioned magenta toner image. Then, similar operations are repeated for yellow and black colors so that toner images in four colors of magenta, cyan, yellow and black are transferred to the recording medium. Then, the recording medium having the four colors of toner images is supplied to fixing rollers where the toner images are fixed under the action of heat and pressure to form a fixed full-color toner image on the recording medium.

A toner used in a method of forming such a fixed color toner image is required to show excellent meltability on heating and color-mixing characteristic and is further preferred to show a low softening point and a low melt viscosity with a highly sharp-melting characteristic.

By using such a sharply melting toner, it is possible to obtain a color copy which shows excellent color reproducibility and is highly faithful to an original image.

However, such a sharply melting toner tends to have a high affinity with fixing rollers and is liable to cause offsetting on a fixing roller.

Particularly, in the case of a fixing means for use in full-color toner image formation, a plurality of toner layers including those of magenta, cyan, yellow and black, such offsetting is particularly liable to be caused.

For the above reason, it has been conventionally practiced to apply a release agent such as silicone oil onto a fixing roller so as to enhance the toner releasability of the fixing roller. In this case, however, the following problems occur.

When a release agent such as oil is applied onto a fixing roller, the entire apparatus becomes complicated, and the life of the fixing roller can be shortened by the oil application.

On the other hand, as one of various demands for copying in recent years, a resinous laminate film such as a transparency film for an overhead projector (OHP) has been widely used as a type of recording material. If a toner image is fixed onto such a laminate film by using a fixing method using such an oil as described above, the applied oil attaches to the surface of the laminate film to remarkably deteriorate the quality of the laminate film for carrying the resultant toner image.

Accordingly, there is an increasing demand for a fixing system that does not require such an oil application at the time of fixing and a novel toner for realizing such a fixing system.

For the above-mentioned problems, there have been proposed a toner containing a release agent such as wax and a toner produced by suspension polymerization (Japanese Patent Publication (JP-B) 36-10231). In the suspension polymerization, a polymerizable monomer and a colorant (and also a polymerization initiator, a crosslinking agent, a charge control agent and other additives, as desired) are uniformly dissolved or dispersed to form a monomer composition, which is then dispersed in a dispersion medium (e.g., aqueous medium) containing a dispersion stabilizer by using an appropriate stirrer and simultaneously subjected to polymerization to form toner particles having a desired particle size.

In the suspension polymerization system, liquid droplets of the monomer composition are formed in a dispersion medium having a large polarity such as water, components having a polar group contained in the monomer composition tend to be present at the surfaces constituting an interface with the aqueous phase and non-polar components tend to be less present at the surface parts to form a so-called pseudo-capsule structure. By utilizing this process characteristic, it is possible to incorporate in a toner a low-melting point wax which cannot be used in another toner production process, such as the pulverization process.

Such a toner obtained by the polymerization process can satisfy both anti-blocking characteristic and low-temperature fixability which are generally contradictory with each other owing to the enclosure of a low-melting point wax. More specifically, the enclosed low-melting point wax does not lower the anti-blocking characteristic but promotes the internal thermal conductivity of the toner to realize low-temperature fixation. As a further preferable aspect, the wax melted at the time of fixation functions also as a release agent, so that undesirable high-temperature offset can be prevented without applying a release agent such as oil onto a fixing roller.

Thus, the polymerization toner enclosing wax shows advantageous performance at the time of fixation but has caused new problems when it is used in combination with a laminate film as the recording medium. Specifically the clarity or transparency of the resultant image after the fixation is somewhat lowered and the enclosed wax as a release agent exudes at the time of fixing to flow onto the image. More specifically, the wax enclosed within the toner is caused to melt under the action of pressure and heat at the time of fixation and, as shown in FIG. 8, is caused to flow on a resinous laminate film R as a recording medium to the rear side with respect to the direction of progress P of the film, thus resulting in a flowout or exudation trace W of wax at the rear end of a fixed image I which is thus made awkward as an image for use in an OHP.

Decreasing the wax content in order to prevent such wax flow may be considered but this results in a lower releasability of the toner. Thus, the above difficulty has been inevitably encountered if wax is used in an amount to provide a sufficient release characteristic.

This wax flow phenomenon is particularly noticeably observed in the case of a resinous recording material such as an OHP film. This may be attributable to a fact that such a resinous recording medium shows a poor ability to absorb melted wax thus allowing the wax to remain on the surface thereof and to flow out to the image. On the other hand, a recording medium such as paper has an abundant absorptivity sufficient to absorb melted wax to prevent the above-mentioned problems leading to deterioration of image quality.

Further, in the case of forming a fixed toner image on a recording medium such as a resinous laminate film, it has been generally frequently practiced to use a lower fixing speed for sufficient toner melting than fixation on an ordinary recording material such as paper as it is strongly desired to form a toner image having a high optical transmittance.

In this case, however, the toner on the recording medium is more liable to be offset to the fixing roller at the time of fixation, so that a larger amount of wax is required to be enclosed within the toner in order to show a sufficient releasability than in the case of fixation of a toner image on a recording medium such as paper.

Further, it has been confirmed that the use of a toner image by using such a toner enclosing wax results in a decrease in clarity of the resultant transparency film due to opacification caused by crystallization of the wax per se. This is presumably because the wax enclosed within the toner layer on a recording medium is caused to exude out of the toner at the time of passing between the fixing rollers thereby to cover the whole or a part of the toner image and have an increased crystallinity, thus causing a remarkably lower optical transmittance.

Accordingly, it is urgently desired to exercise a measure by which a sufficient amount of wax can be contained without impairing the clarity of the resultant image and without causing a trace of wax flow even on a recording medium such as a resinous laminate film.

Further, in the case of forming a color or full-color toner image on a transparent laminate film by using an electrophotographic system of the dry development type and projecting the toner image onto a screen by means of an OHP apparatus, the projected image can show a grayish tint as a whole to result in a very narrow range of color reproduction even when the image on the film shows a sufficient color reproducibility. This phenomenon is caused because the yet-unfixed toner image on a smooth laminate film is not provided with a sufficient fluidity by the heating at the time of fixation to retain its particle characteristic and the light incident on the toner image at the time of the projection is scattered to form a shadow on the screen. Particularly, at a halftone part showing a low image density, the absorption level by the dye or pigment in the toner is lowered due to a decrease in the number of toner particles and the resultant absorption level becomes identical to a black absorption level due to scattering of the toner particles, so that the reproduced color tint becomes grayish.

In the case of naked eye observation of a toner image on a recording medium such as plain paper, a light image reflected from an illuminated fixed toner image is observed, so that the image quality is little affected even if the toner surface retains some particle characteristic. In the case of observing or projecting a toner image onto a screen by transmitted light as in an OHP apparatus, the image quality based on transmittance is remarkably impaired due to light scattering if the toner image retains some toner particle shape. Accordingly, the recording medium for use in an OHP apparatus is required to provide a fixed toner image which retains less particle characteristic and shows an improved optical transmittance while preventing an offset phenomenon onto the fixing roller at the time of fixation.

SUMMARY OF THE INVENTION

An object of the present invention is to provide a laminate film for receiving the toner image having solved the above-mentioned problems and also a method for forming a fixed toner image on such a laminate film.

An object of the present invention is to provide a laminate film capable of forming a fixed toner image of excellent quality thereon without using oil at the time of fixation and a method for forming a fixed toner image on such a laminate film.

An object of the present invention is to provide a laminate film capable of providing a fixed toner image with excellent clarity or transparency and a method for forming a fixed toner image on such a laminate film.

Another object of the present invention is to provide a laminate film capable of forming thereon a fixed toner image of excellent quality while preventing flowout of a wax component contained in a toner at the time of fixation and a method for forming a toner image on such a laminate film.

A further object of the present invention is to provide a laminate film capable of forming thereon a fixed toner image which provides a color or full-color projected image with good color reproducibility and free from graying in tint as a whole, and a method for forming a fixed toner image on such a laminate film.

A still further object of the present invention is to provide a laminate film capable of forming a toner image thereon with excellent performance of preventing toner offset onto a fixing means at the time of fixation, and also a method for forming a fixed toner image on such a laminate film.

According to a principal aspect of the present invention, there is provided a laminate film for receiving a toner image containing a wax component, comprising: an absorbing layer for absorbing the wax component, and a substrate supporting the absorbing layer.

According to another aspect of the present invention, there is provided a method for forming a fixed toner image on a laminate film, comprising:

a developing step for developing an electrostatic latent image on an electrostatic image-bearing member with a toner containing a wax component to form a toner image on the electrostatic image-bearing member;

a transfer step for transferring the toner image onto the laminate film, the laminate film comprising an absorbing layer for absorbing the wax component in the toner and a substrate supporting the absorbing layer; and a fixing step for fixing the toner image onto the laminate film under heat and pressure while absorbing the wax component in the toner with the absorbing layer of the laminate film.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
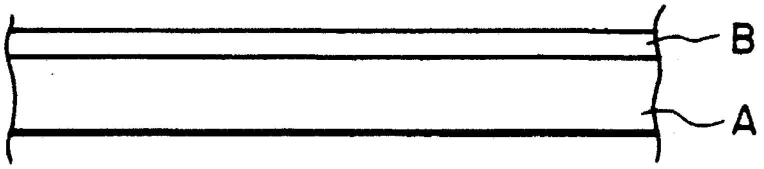
FIG. 1 is a sectional view showing an embodiment of the laminate film according to the present invention.

The laminate film according to the present invention is characterized by having an absorbing layer for absorbing a wax component contained in a toner.

The absorbing layer may be formed by containing inorganic fine particles. The absorptivity of the wax component into the absorbing layer is related with an average pore radius (D) of the absorbing layer or by the inorganic fine powder per se, which is preferably in the range of 10–200 Å. Outside the average pore radius (D) range of 10–200 Å, the wax absorptivity is lowered.

The absorbing layer may preferably have a thickness in the range of 0.1–10 microns, more preferably 0.5–5 microns. If the thickness is below 0.1 micron, the wax absorptivity becomes insufficient and, if the thickness exceeds 5 microns, the laminate film is liable to be turbid to result in a lower transmittance.

The laminate film according to the present invention may preferably have a specific surface area of 0.1–30 $m^2/g$ which is generally attributable to that of the absorbing layer and the contribution of the base film is generally negligible. If the specific surface area of the laminate film is below 0.1 $m^2/g$, the wax absorptivity of the absorbing layer becomes insufficient. If the specific surface area exceeds 30 $m^2/g$, the transparency of the laminate film is lowered and most of the wax component contained in the toner is absorbed by the laminate film, thus failing to exhibit the intended release effect.

The average pore diameter of the inorganic fine powder or the absorbing layer and the specific surface area of the laminate film may be measured through nitrogen absorption according to the constant volume method and calculated based on the Kelvin formula and BET theory. The values described herein are values measured by using a commercially available gas absorption meter ("Autosorb 1", available from Yuasa Ionic K.K.). For measurement of the specific surface area of the laminate film, a laminate film sample measuring 100 mm×100 mm is cut into pieces each measuring 5×5 mm, and all the cut pieces are placed in the gas absorption meter.

The structure of the laminate film according to the present invention will be described with reference to FIG. 1.

Referring to FIG. 1, a laminate film according to the present invention comprises a base film A of a transparent resin as a substrate and an absorbing layer B formed on the base film A. The base film A is required to have a heat resistance so as not to cause a noticeable thermal deformation due to heating for heat fixation or heat and pressure fixation. More specifically, the base film A may preferably have a heat distortion temperature of 145° C. or higher, more preferably 150° C. or higher, as measured under the condition of 4.6 $Kg/cm^2$ according to ASTM D648. Specific examples of such a base film A may include films of polyethylene terephthalate (PET), polyester, polyamide and polyimide showing a heat resistance represented by a heat distortion temperature of 145° C. or higher under the above condition and a maximum usable temperature of 100° C. or higher. Among these, polyethylene terephthalate film is particularly preferred in view of its heat resistance and transparency. The base film is required to have a thickness not subject to wrinkles even when softened under heating for fixation. A thickness of 50 microns or more is sufficient, e.g., in the case of polyethylene terephthalate. Even a transparent film can cause a lowering in transmittance if it becomes excessively thick. For these reasons, the base film A may preferably have a thickness of 50–300 microns, more preferably 100–200 microns, and further preferably 70–150 microns.

Referring to FIG. 1, the absorbing layer B may be formed by application or adhesion of inorganic fine powder on the base film so as to provide fine pores.

The inorganic fine powder may for example comprise activated alumina, aluminum hydroxide, hydrated alumina, silica and titanium oxide. These materials may be used singly or in mixture of two or more species.

The inorganic fine powder may preferably have an average primary particle size of 0.001–0.1 micron, more preferably 0.001–0.05 micron. If the particle size is below 0.001 micron, the cohesive force between particles becomes too large to form a uniform absorbing layer and, if the particle size exceeds 0.1 micron, the wax absorptivity or transparency of the absorbing layer is impaired.

The absorbing layer B may for example be formed on the absorbing layer A by dispersing such an inorganic fine powder in an appropriate solvent together with an appropriate binder, as desired, to form a coating liquid and applying the coating liquid onto the base film A by known coating methods, followed by drying.

The solvent can have a solubility capable of slightly dissolving the surface of the base film A or the inorganic fine powder.

Examples of the binder may include known film-forming resins, such as polyester resins, vinyl resin, butadiene resins, epoxy resins, polyamide resins and polyurethane resins.

The binder resin and the inorganic fine powder may be used in a weight ratio of 1:1–1:50, more preferably 1:3–1:20.

The absorbing layer B can also be formed by coating the base film A with a layer of the inorganic fine particles by known deposition methods such as CVD (chemical vapor deposition) and PVD (physical vapor deposition).

In order to enhance the adhesion between the base film A and the inorganic fine powder or binder resin, it is possible and preferred to apply a surface treatment such as plasma or corona discharge, or a primer layer to the base film A.

Explanation is made on a polymerization toner as a preferred example of a toner used in combination with the laminate film according to the present invention. Such a polymerization toner may be produced in the following manner.

Additives such as a release agent, a colorant and a charge control agent are added in a polymerizable monomer, and the mixture is heated until the release agent is dissolved or melted and is subjected to uniform dissolution or dispersion by using a mixer such as a homogenizer or an ultrasonic disperser to form a monomer composition, which is then dispersed in an aqueous medium containing a dispersion stabilizer at a temperature nearly equal to that of the monomer composition by using a mixer, such as an ordinary stirrer. The stirring speed and time are preferably adjusted so as to provide the resultant monomer droplets with a prescribed toner size of generally 30 microns or smaller, and thereafter the stirring is continued at such an intensity as to retain the particle size and prevent the precipitation of the particles under the action of a dispersion stabilizer. The polymerization temperature is set to a temperature below the precipitation temperature of the release agent, and a polymerization initiator is added to effect the polymerization. After the reaction, the produced toner particles are washed, recovered by filtration and dried. In the suspension polymerization, it is generally preferred to use 300–3000 wt. parts of water as a dispersion medium per 100 wt. parts of the monomer composition.

Examples of the polymerizable monomer usable for constituting the polymerization toner may include: styrene-type monomers, such as styrene, o-methylstyrene, m-methylstyrene, p-methylstyrene, p-methoxystyrene, and p-ethylstyrene; acrylates, such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chloroethyl acrylate and phenyl acrylate; methacrylates, such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; acrylonitrile, methacrylonitrile, and acryl amide.

These monomers may be used singly or in mixture of two or more species. Among the above monomers, styrene or a styrene derivative may preferably be used singly or in mixture with another monomer in view of developing characteristics and successive image forming characteristics of the resultant toner.

The dispersion medium for producing the polymerization toner may be formed by dispersing a stabilizer, such as polyvinyl alcohol, gelatin, methyl cellulose, methyl hydroxypropyl cellulose, ethyl cellulose, sodium salt by carboxymethyl cellulose, polyacrylic acid or its salt, starch, calcium phosphate, aluminum hydroxide, magnesium hydroxide, calcium metasilicate, barium sulfate or bentonite in an aqueous medium. The stabilizer may preferably be used in an amount of 0.2–20 wt. parts per 100 wt. parts of the polymerizable monomer.

In order to finely disperse such a stabilizer, 0.001–0.1 wt. part of a surfactant may be used. The surfactant functions to promote the action of the dispersion stabilizer, and examples thereof may include: sodium dodecylbenzenesulfonate, sodium tetradecyl sulfate, sodium pentadecyl sulfate, sodium octyl sulfate, sodium oleate, sodium laurate, potassium stearate, and calcium oleate.

It is further preferred to add a polymer or copolymer having a polar group in the monomer composition for polymerization. Further, it is preferred in the present invention that a monomer composition to which a polymer, copolymer or cyclic rubber having a polar group has been added is suspended for polymerization in an aqueous medium which contains a dispersant chargeable to a polarity reverse to that of the polar polymer, etc. More specifically, a cationic (or anionic) polymer, copolymer or cyclic rubber contained in the monomer composition exerts an electrostatic attraction force at the surfaces of droplets of the monomer composition under polymerization with an anionic (or cationic) dispersant of the reverse chargeability, so that the surfaces of the droplets are covered with the dispersant to prevent the coalescence of the droplets and stabilize the dispersion, and the added polar polymer, etc., are caused to gather at the surfaces of the droplets to form a kind of shell, thus providing toner particles of a pseudo-capsule structure. A toner satisfying both fixability and anti-blocking characteristic which are generally contradictory with each other can be obtained by forming a shell of a polar polymer (or copolymer or cyclic rubber) having a relatively high molecular weight so as to provide excellent anti-blocking and anti-offset characteristic and a core of a component having a relatively low molecular weight contributing to an improved fixability through the polymerization. Examples of the polar polymer or copolymer and the reversely chargeable dispersant are enumerated below:

(1) Cationic polymers or copolymers, inclusive of: homopolymers of a nitrogen-containing monomer, such as dimethylaminoethyl methacrylate or diethylaminoethyl methacrylate, and copolymers of such a nitrogen-containing monomer with another monomer, such as styrene or an unsaturated carboxylic acid ester.

(2) Anionic polymers or copolymers, inclusive of: homopolymers of a nitride monomer such as acrylonitrile, a halogen-containing monomer such as vinyl chloride, an unsaturated carboxylic acid such as acrylic acid or methacrylic acid, an unsaturated dibasic acid, an unsaturated dibasic acid anhydride, and a nitro group-containing monomer, and also copolymers of these monomers with a styrene-type monomer.

Cyclic rubber can be used instead of the above-mentioned polar polymer or copolymer.

(3) Anionic dispersants including silica fine powder, particularly colloidal silica having a BET specific surface area of 200 $m^2/g$ or larger.

(4) Cationic dispersants including hydrophilic positively chargeable silica fine powder, such as aminoalkyl-modified colloidal silica, preferably having a BET specific surface area of 200 $m^2/g$ or larger, and aluminum hydroxide.

Such a dispersant may preferably be used in a proportion of 0.2–20 wt. parts, particularly 0.3–15 wt. parts, per 100 wt. parts of the polymerizable monomer composition.

In the present invention, it is preferred to incorporate a charge control agent in the toner to control the chargeability of the toner. The charge control agent may be those having little polymerization inhibiting characteristic and little transferability to an aqueous medium selected from known charge control agents. Examples of positive charge control agents may include: nigrosine dyes, triphenylmethane dyes, quaternary ammonium salts, amine compounds and polyamine compounds. Examples of negative charge control agents may include: metal-containing salicylic acid compounds, metal-containing monoazo dye compounds, styrene-acrylic acid copolymer, and styrene-methacrylic acid copolymer.

The colorant contained in the toner used in the present invention may be conventional. Examples thereof may include: carbon black; iron black; dyes, such as C. I. Direct Red I, C. I. Direct Red 4, C. I. Acid Red 1, C. I. Basic Red 1, C. I. Mordant Red 30, C. I. Solvent Red 49, C. I. Solvent Red 52, C. I. Direct Blue 1, C. I. Direct Blue 2, C. I. Acid Blue 9, C. I. Acid Blue 15, C. I. Basic Blue 3, C. I. Basic Blue 5, C. I. Mordant Blue 7, C. I. Direct Green 6, C. I. Basic Green 4, and C. I. Basic Green 6; and pigments, such as Lead Yellow, Cadmium Yellow, Mineral Fast Yellow, Navel Yellow, Naphthol Yellow S, Hansa Yellow G, Permanent Yellow NCG, Turtladine Lake, Molybdenun Orange, Permanent Orange GTR, Benzidine Orange G, Cadmium Red, Permanent Red 4R, Watching Red Ca-salt, Brilliant Carmine 3B, Fast Violet B, Methyl Violet Lake, Ultramarine, Cobalt Blue, Alkali Blue Lake, Victoria Blue Lake, guinacridone, disazo-type yellow pigments, Phthalocyanine Blue, Fast Sky Blue, Pigment Green B, Malachite Green Lake, and Final Yellow Green G. When the toner is produced by polymerization, it is necessary to pay attention to the polymerization prohibiting property and transferability to water of a colorant used. For this reason, it is preferred to apply to the colorant used a surface treatment, such as a hydrophobicity-imparting treatment with a substance free from polymerization-inhibiting characteristic.

Examples of the wax contained as a release agent in the toner used in the present invention may include: paraffin-type waxes, polyolefin-type waxes and modified products (e.g., oxidation or grafting products) of these, higher fatty acids and their metal salts and amide wax, but these are not exhaustive.

The wax used in the present invention may preferably have a melting point in the range of 30°–150° C., more preferably 40°–140° C. If the melting point is below 30° C., the anti-blocking characteristic and shape-retaining characteristic of the resultant toner becomes insufficient. If higher than 150° C., a sufficient release effect is not exhibited. The melting point herein is one measured as a temperature giving a maximum heat absorption peak on a DSC (differential scanning calorimeter) curve.

The wax used in the present invention may preferably be one showing a melting enthalpy ΔH of 50–250 J/g.

Such a wax may preferably be used in a proportion of 0.1–50 wt. parts, more preferably 1–45 wt. parts, further more preferably 5–40 wt. parts, per 100 wt. parts of the polymerizable monomer. Below 0.1 wt. part, little release effect is exhibited. Above 50 wt. parts, the stability in production is lowered, and the anti-blocking characteristic and storage stability are also liable to be lowered.

Examples of the polymerization initiator may include: azo or diazo type polymerization initiators, such as 2,2'-azobis(2,4-dimethylvaleronitrile), 2,2'-azobisisobutyronitrile, 1,1'-azobis(cyclohexane-1-carbonitrile) and 2,2'-azobis-4-methoxy-2,4-dimethylvaleronitrile; and peroxide type polymerization initiators, such as benzoyl peroxide, methyl ethyl ketone peroxide, diisopropyl peroxycarbonate, cumene hydroperoxide, 2,4-dichlorobenzoyl peroxide, and lauroyl peroxide. It is also possible to use a redox type initiator comprising a peroxide as described above and a reducing agent, such as dimethylaniline, a mercaptan, a tertiary amine, an iron (II) salt or sodium sulfite.

The polymerization initiator may be appropriately used so as to provide a desired molecular weight, and the amount thereof in 0.1–10 wt. % of the polymerizable monomer may generally be sufficient.

Some further explanation is given to the wax (release agent), polymerization initiator and polymerization temperature.

When a wax having a low melting or softening point, such as paraffin wax, is used, the wax is precipitated from the polymerizable monomer composition at a low temperature, and the polymerization temperature is lowered correspondingly. In such a case, it is preferred to use an initiator having a short half-life, such as a redox initiator or 2,2'-azobis-4-methoxy-2,4-dimethylvaleronitrile.

In the case of using a wax having a high melting or softening point, such as polyolefin wax, it is preferred to use an autoclave for dissolving or melting the wax in the polymerizable monomer composition and use a polymerization initiator, such as 2,2'-azobis(2,4-dimethylvaleronitrile) or dimethyl-2,2'-azobisisobutyrate as the wax has a higher precipitation temperature than in the above-mentioned case of a wax having a low melting point or softening point, such as paraffin wax.

In the present invention, it is also possible to use a toner obtained through kneading, pulverization and classification in addition to the above-mentioned polymerization toner. The binder resin for this purpose may be a homopolymer or copolymer of the above-mentioned monomers for producing the polymerization toner inclusive of styrene-type monomers and acidic monomers, such as acrylic acid, methacrylic acid and maleic acid and esters thereof, polyester, polysulfonate, polyether, polyurethane, or a mixture of the above resins. Such a so-called pulverization toner may be prepared by mixing and melt-kneading the binder resin with other toner components by using a hot kneading means, such as hot rollers, a kneader or an extruder, followed by mechanical pulverizerion and classification.

In the toner used in the present invention, it is possible to add known additives for imparting various characteristics. Such additives may preferably have a particle size which is 1/10 or less of the volume-average particle size of the resultant toner particles in view of the durability of the resultant toner. The particle size of the additive referred to herein means an average particle size obtained by surface observation of toner particles through an electron microscope. Examples of such additives for imparting various properties may include the following:

1) Fluidity-imparting agent: metal oxides (such as silicon oxide, aluminum oxide, and titanium oxide), carbon black, fluorinated carbon. It is preferred that these have been subjected to a hydrophobicity-imparting treatment.

2) Abrasive: metal oxides (such as strontium titanate, cerium oxide, aluminum oxide, magnesium oxide, and chromium oxide), nitrides (such as silicon nitride), carbides (such as silicon carbide), metal salts (such as calcium sulfate, barium sulfate, and calcium carbonate).

3) Lubricant: powder of fluorine-containing resin (such as polyvinylidene fluoride and polytetrafluoroethylene), fatty acid metal salts (such as zinc stearate and calcium stearate).

4) Charge-controlling particles: particles of metal oxides (such as tin oxide, titanium oxide, zinc oxide, silicon oxide, and aluminum oxide), and carbon black.

These additives may preferably be added in an amount in the range of 0.1–10 wt. parts, more preferably 0.1–5 wt. parts, per 100 wt. parts of the toner particles. These additives may be added singly or in combinations of two or more species.

In the present invention, so as to provide a laminate film having good transmittance and color-reproducibility of the projected image, it is preferred to provide on the surface of a substrate heat-resistant film a layer of a transparent resin which is compatible with a binder resin constituting toner particles used for color image formation and has a thermal fusion characteristic different from that of the toner binder resin.

Figure 2:
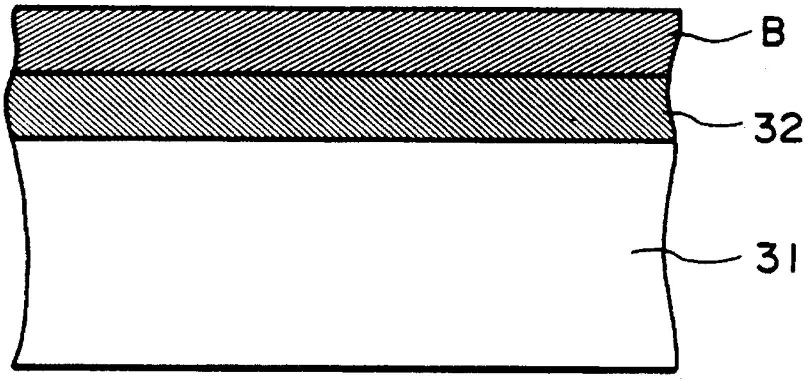
FIGS. 2–5 are respective sectional views showing other embodiment of the laminate film according to the present invention.
Figure 3:
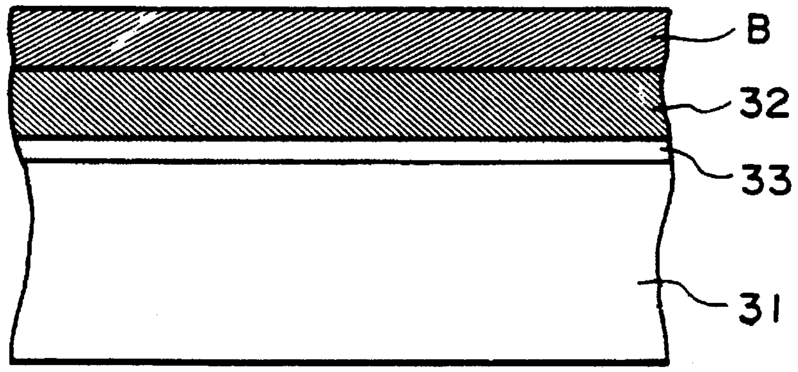

FIGS. 2 and 3 illustrate such embodiments.

Referring to FIGS. 2 and 3, each laminate film comprises a transparent base film 31 which is similar to the base film A in the embodiment shown in FIG. 1, and thereon a transparent resin layer 32 as described above for improving the transmittance of the fixed color image. It is preferred that the transparent resin layer 32 is compatible with the toner binder resin constituting toner particles forming a color image at the temperature of hot fixation. The compatibility with the toner binder resin means that no boundary is formed between the resin of the transparent resin layer 32 and the toner binder resin in the fixed image. As a measure of selection, it is preferred that the resin of the transparent resin layer 32 has a solubility parameter in the range of ±1.5, more preferably ±1.0, with solubility parameter of the toner binder resin as the principal toner binder resin (constituting 50 wt. % or more of the whole binder resin). The solubility parameters of various resins are disclosed in many publications inclusive of polymer handbooks. For example, when a polyester resin having a solubility parameter of about 11.0 is used as a principal toner binder resin, the resin of the transparent resin layer 32 may suitably be a thermoplastic resin, such as polyester resin, polymethyl methacrylate resin, epoxy resin, polyurethane resin, vinyl chloride resin or vinyl chloride-vinyl acetate copolymer resin having a solubility parameter of 11.0±1.5. It is particularly preferred that the resin of the transparent resin layer 32 is composed of a resin of the same species as the principal toner binder resin.

The resin used in the transparent resin layer 32 may preferably have a storage modulus (G') of $1\times10^3$–$1\times10^6$ dyn/$cm^2$ more preferably $5\times10^3$–$5\times10^5$ dyn/$cm^2$, as measured at 160° C. and a frequency (w) of 100 rad/sec. If the storage modulus (G') is below 133 $10^3$ dyn/$cm^2$, an offset phenomenon is liable to occur when a toner image is fixed by a hot pressure roller and the transparent resin layer 32 is liable to be partially peeled off the base film 31 and be damaged. If the storage modulus (G') exceeds $1\times10^6$ dyn/$cm^2$, a toner image is allowed to enter only a very slight degree into the transparent resin layer 32 under fixation by a hot pressure roller, so that the resultant toner image becomes grayish as a whole.

The storage modulus (G') values for the resin constituting the transparent resin layer referred to herein are based on values measured by using a mechanical spectrometer ("RMS-800", available from Rheometrics Inc.) under the conditions including a frequency (W) of 100 rad/sec and an automatically determined strain rate. The transparent resin layer 32 may have a thickness of 3–30 microns, preferably 8–15 microns, while the optimum thickness can vary depending on the particle size of the toner to be fixed thereon.

An absorbing layer B similar to the one in the embodiment shown in FIG. 1 may be formed on the transparent resin layer 32 in the same manner as explained with reference to FIG. 1.

The embodiment of FIG. 3 is similar to the one of FIG. 2 except that an adhesive layer 33 is disposed between the base film 31 and the transparent resin layer 32 so as to enhance the adhesion between these layers. The adhesive layer 33 may comprise a resin which is compatible with resins constituting the base film 31 and the transparent resin layer 32, examples of such a resin may include: polyester resin, acrylate resin, methacrylate resin, styrene-acrylate copolymer, and styrene-methacrylate copolymer.

Figure 4:
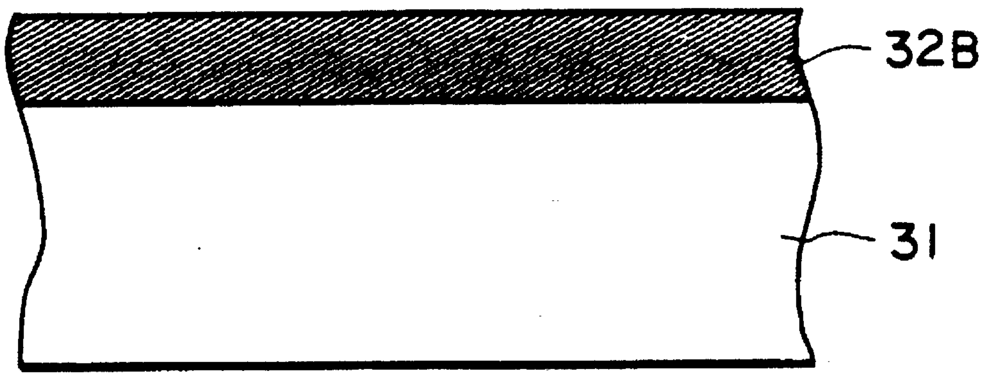
Figure 5:
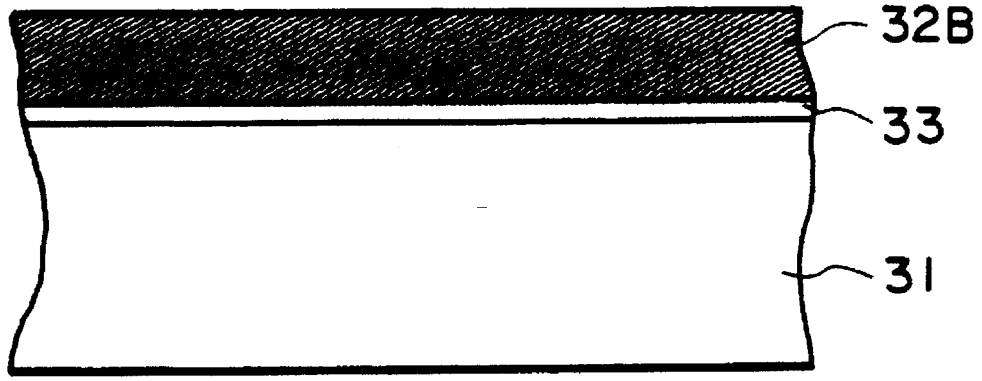

FIGS. 4 and 5 show other embodiments of the laminate film according to the present invention which correspond to those shown in FIGS. 2 and 3, respectively, but separate absorbing layers B shown in FIGS. 2 and 3 are omitted by dispersing the above-mentioned inorganic fine powder in the transparent resin layers to form a transparent resin layer 32B having wax-absorptivity. In these cases, it is preferred that the transparent resin layer 32B is provided with pores having an average pore radius (D) of 10–200 Å.

The transparent resin layer 32 or 32B may be formed on the base film 31 by dissolving a resin therefor in a volatile solvent such as an alcohol, e.g., methanol and ethanol, and ketones, e.g., methyl ethyl ketone and acetone, and further dispersing the inorganic fine powder therein for the transparent resin layer 32B, and then applying the resultant coating liquid by bar coating, dipping, spraying, or spin coating onto the base film 31, followed by drying. In order to enhance the adhesion between the base film 31 and the transparent resin layer 32 or 32B so as to prevent a toner image from being peeled off the base film 31 or the entire laminate film, the surface of the base film can be processed with plasma or corona discharge in addition to or alternatively with the formation of an adhesive layer 33 (FIG. 3 and FIG. 5).

Now, a toner used for image formation in combination with the laminate film according to the present invention will be explained.

A toner used in a color electrophotographic apparatus is required to show good melting and color mixing characteristic on heating, a low softening point, a low storage modulus at the fixation temperature and a sharp meltability.

In relation with the laminate film, it is preferred that the toner has a storage modulus which is clearly smaller than the resin constituting the transparent resin layer 32 or 32B. More specifically, the toner may preferably show a storage modulus of $1\times10^2$–$1\times10^5$ dyn/$cm^2$, more preferably $5\times10^2$–$5\times10^4$ dyn/$cm^2$, so as to provide good compatibility with the transparent resin layer 32 or 32B and color mixing characteristic between toners.

A color copy faithful to an original multi-color or full-color image can be formed and a color reproduction range is enlarged by using sharp melting toners.

It is particularly preferred to use a toner comprising a polyester resin as a binder resin in combination with the laminate film according to the present invention, in view of fixation and sharp melting characteristics. An example of the sharp melting polyester is a polymer having ester linkages in its polymer main chain synthesized from a diol compound and a dicarboxylic acid.

In view of sharp melting characteristics, it is particularly preferred to use a polyester resin, which has been obtained through condensation polymerization of at least a hisphenol derivative represented by the formula:

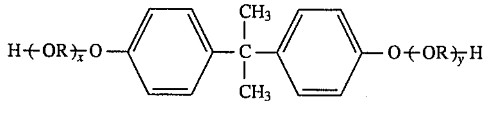

(wherein R denotes an ethylene or propylene group, x and y are independently a positive integer of 1 or larger giving an average of x+y in the range of 2–10) or a substitution derivative thereof with a carboxylic acid component (such as fumaric acid, maleic acid, maleic anhydride, phthalic acid, terephthalic acid, trimellitic acid and pyromellitic acid) selected from two or more functional carboxylic acids, arthydrides and lower alkyl esters thereof.

Such a polyester resin may preferably have a softening point of 75°–150° C., more preferably 80°–130° C. The softening characteristic of a toner comprising a polyester resin as a binder resin is shown in FIG. 6 as measured according to a method described below.

Figure 6:
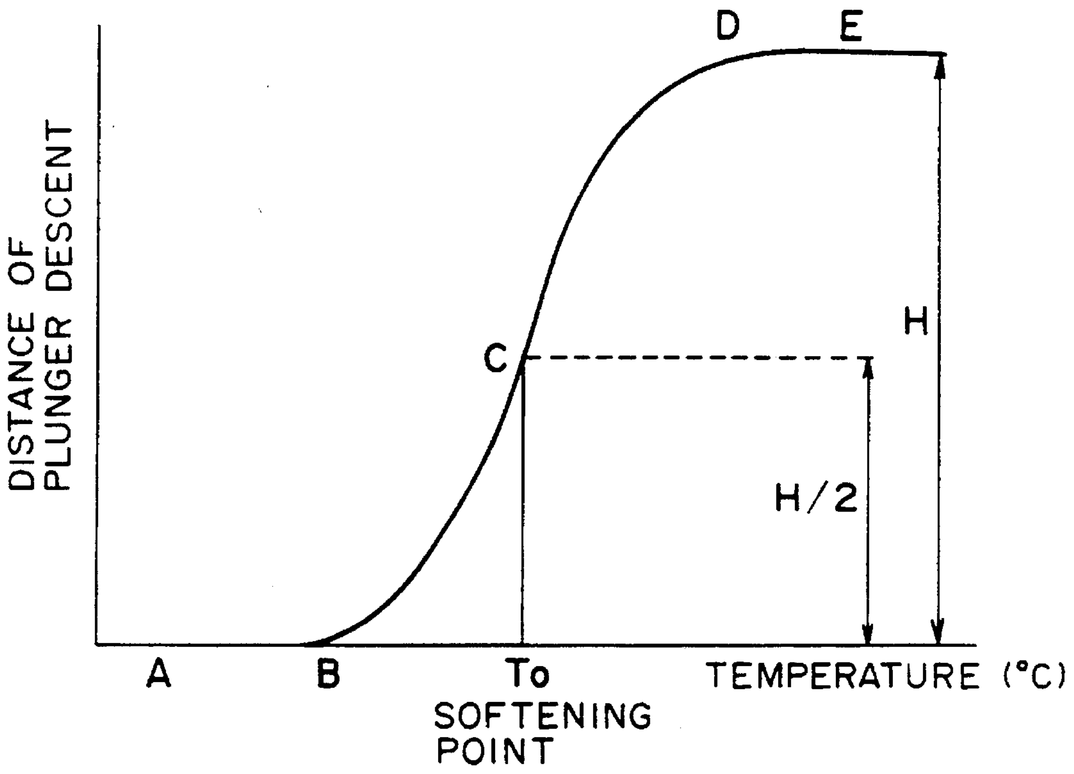
FIG. 6 is a graph for illustrating a melting characteristic of a toner relating to the present invention.
Figure 8:
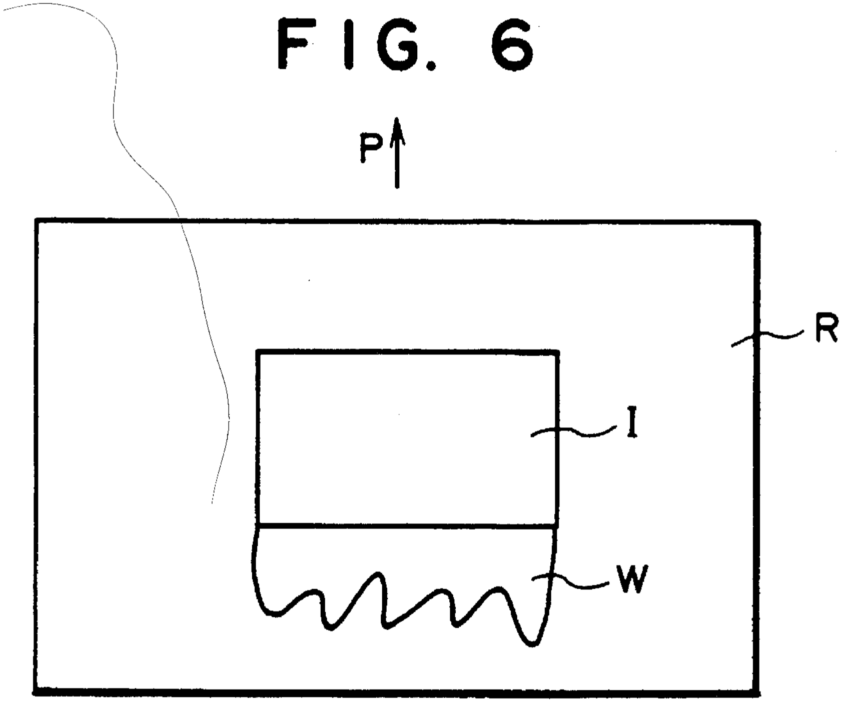
FIG. 8 is a plan view for explaining a problem of wax flowout encountered when a fixed toner image is formed by using a conventional laminate film.

A toner softening characteristic is represented by a curve of plunger descending distance vs. temperature (softening S-character curve) as shown in FIG. 6. A sample toner or resin in an amount of 1–3 g accurately weighed is placed on a die having a nozzle diameter of 0.2 mm and a thickness of 1.0 mm and preheated at an initially set temperature of 70° C. for 30 sec and then heated at a constant temperature-raising rate of 6° C./min. under a plunger having a sectional area of 10 $cm^2$ and exerting an extrusion weight of 20 kg. As the temperature is raised at a constant rate, the toner is gradually heated to start flowing (A→B). On further heating, the toner is melted to flow at a large rate (B→C→D) and then the plunger descent is ceased to complete the extrusion (D→E).

The height H of the S-character curve corresponds to the total amount of the flowing toner or resin sample, and a temperature at a point C at a height H/2 represents the softening point of the sample.

In relation with the laminate film, it is preferred that the toner or its binder resin shows a storage modulus (G') smaller than that of the resin constituting the transparent resin layer 32 or 32B respectively measured at 160° C. and a frequency of 100 rad/sec. It is preferred that the transparent resin layer 32 or 32B shows a higher modulus than the toner or toner binder resin at a fixing temperature (e.g., 130°–170° C.). In case where the resin constituting the transparent resin layer 32 or 32B has a storage modulus (G') close to that of the toner binder resin at the fixing temperature, if fixing is performed under such a condition that a portion having two or more colors of toners overlapping with each other and also a portion of a single color toner for producing a full color toner are both fixed to provide a sufficient transparency at a single fixing operation, then the transparent resin layer 32 or 32B is also sufficiently heated to lower its viscoelasticity, so that the layer 32 or 32B is liable to be peeled off at the interface with the base film 31 and thus a part of 5 the image can be peeled off and taken away by the hot fixing roller, thus causing a high temperature offset.

In the case where the resin constituting the transparent resin layer 32 or 32B has a storage modulus (G') lower than that of the toner binder resin, a single color toner image can be fixed onto the layer 32 or 32B, but good color mixing is difficult when toner images of different colors are fixed in superposition since the melt viscosity of the transparent resin layer 32 or 32B becomes lower than that of the toner binder resin.

In the case where the resin of the transparent resin layer 32 or 32B exceeds 1000 times that of the toner binder resin at a fixing temperature (e.g., 160° C.), a practically acceptable level of transparency is attained for a thin image of a single color but a multi-color or full-color image or a high-density image results in an unevenness due to thickness irregularity of multiple toner layers because the transparent resin layer 32 or 32B does not cause a sufficient degree of deformation as to absorb the thickness irregularity. Thus, the transparency is liable to be impaired. Further, because of a poor adhesiveness between the transparent resin layer 32 or 32B and the toner, a separation can occur within the toner layer to cause an offset.

The thickness of the transparent resin layer 32 or 32B can vary depending on the toner particle size but should be at least 0.5 times the average toner particle size so as to provide a sufficient transmittance to a low density portion having a thickness of only one toner particle. If the thickness exceeds three times the toner particle size, then the amount of melting resin increases, resulting in obscure or strained images and also cracking of images due to flexure. The thickness is preferably 0.5–2 times the volume-average particle size of the toner.

More specifically, in the case of using a toner having a volume-average particle size of 6 microns, it is preferred to use a transparent resin layer 32 or 32B having a thickness of 3–12 microns and, in the case of using a toner having a volume-average particle size of 15 microns, it is preferred to use a transparent resin layer 32 or 32B having a thickness of 7.5–30 microns.

The average particle size of a toner is measured by means of a Coulter counter in the present invention, while it may be measured in various manners.

Coulter counter Model TA-II (available from Coulter Electronics Inc.) is used as an instrument for measurement, to which an interface (available from Nikkaki K.K.) for providing a number-basis distribution, and a volume-basis distribution and a personal computer CX-1 (available from Canon K.K.) are connected.

For measurement, a 1%-NaCl aqueous solution as an electrolytic solution is prepared by using a reagent-grade sodium chloride. For example, ISOTON®-II (available from Coulter Scientific Japan K.K.) may be used therefor. Into 100 to 150 ml of the electrolytic solution, 0.1 to 5 ml of a surfactant, preferably an alkylbenzenesulfonic acid salt, is added as a dispersant, and 2 to 20 mg of a sample is added thereto. The resultant dispersion of the sample in the electrolytic liquid is subjected to a dispersion treatment for about 1–3 minutes by means of an ultrasonic disperser, and then subjected to measurement of particle size distribution in the range of 2–40 microns by using the above-mentioned Coulter counter Model TA-II with a 100 micron-aperture to obtain a volume-basis distribution and a number-basis distribution. From the measured particle size distribution, the volume-average particle size of the toner may be obtained.

Now, the color image forming method according to the present invention will be described.

Figure 7:
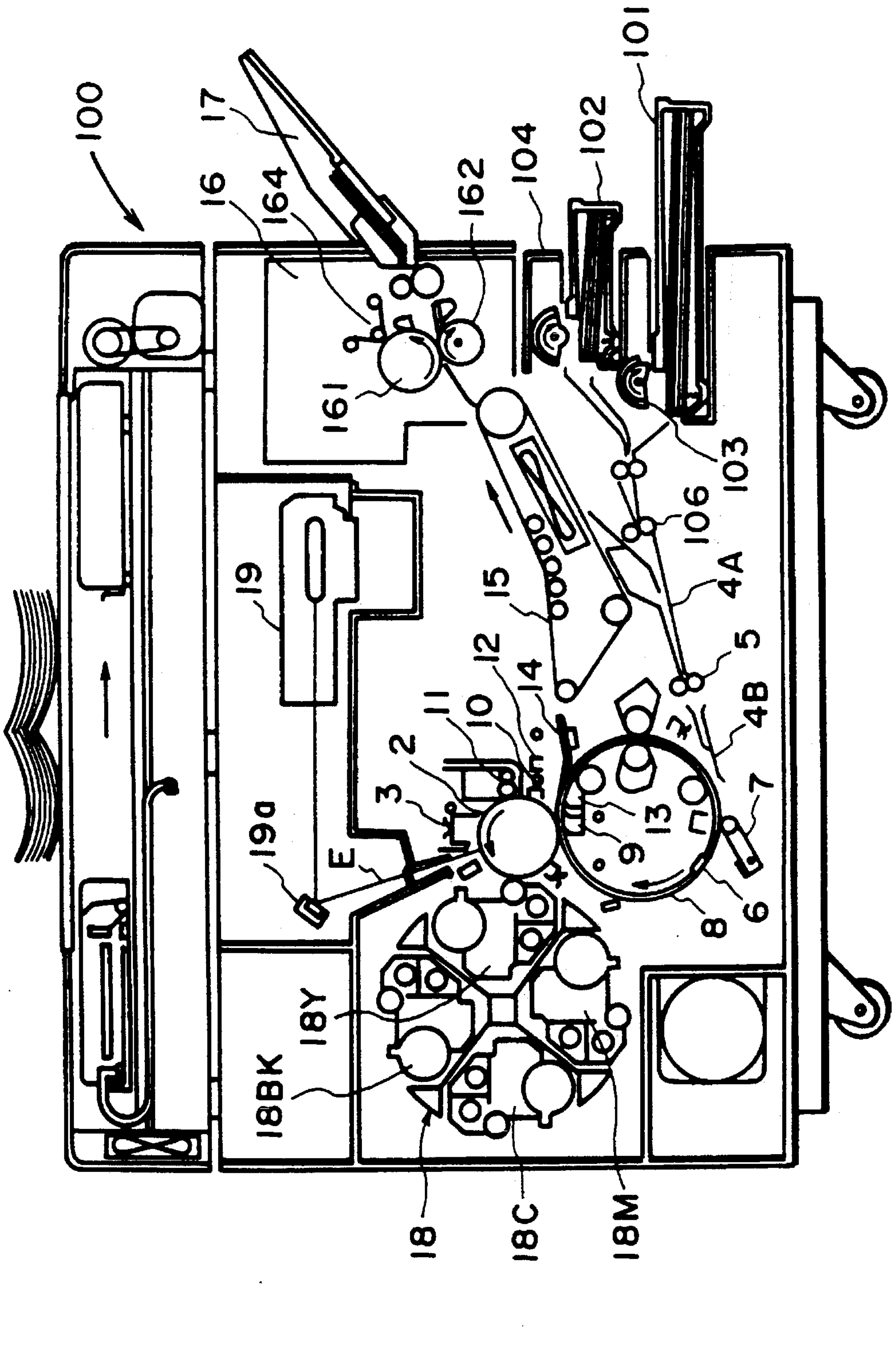
FIG. 7 is a schematic view of an image forming apparatus to which the laminate film according to the present invention is applicable and which is applicable for practicing an embodiment of the image forming method according to the present invention.

FIG. 7 is a schematic sectional view of an electrophotographic apparatus 100 capable of producing a full-color image according to the method of the present invention. Referring to the figure, the apparatus is roughly divided into a recording medium-conveying system (I) including a transfer drum 8 and shown in a right-to-middle part of the apparatus, a latent image-forming section (II) disposed at the middle of the apparatus adjacent to the transfer drum 8, and a rotary developing apparatus (III) as a developing means disposed adjacent to the latent image-forming section (II). The recording medium-conveying system (I) includes recording medium-supplying trays 101 and 102 disposed releasably in an opening provided on the right side of the apparatus body 100; recording medium-feed rollers 103 and 104 disposed almost immediately above the trays 101 and 102; recording medium-supply guides 4A and 4B disposed adjacent to the rollers 103 and 104 and equipped with supply rollers 106; the transfer drum 8 rotatably disposed adjacent to the recording medium supply roller 4B and having an abutting roller 7, a gripper 6, a recording medium-separation charger 12 and a separation claw 14 in this order from upstream to downstream in the direction of its rotation indicated by an arrow along its outer periphery, and also a transfer charger 9 and a recording medium-separation charger 13 inside thereof; a conveyer belt means 15 disposed adjacent to the separation claw 14; a discharge tray 17 disposed adjacent to the conveying end of the conveyer belt means 15 and extending outwardly from the apparatus body 100 so as to be releasable from the body 100; and a fixer 16 disposed adjacent to the tray 17.

The latent image-forming section (II) includes an electrostatic latent image-holding member (i.e., photoconductive drum) 2 disposed rotatably in the direction of an arrow so that its outer periphery contacts the outer surface of the transfer drum 8, and a charge-removing charger 10, a cleaning means 11, a primary charger 3, and an imagewise exposure means such as a laser beam scanner 19 including a polygonal mirror 19*a* for illuminating the outer surface of the photosensitive drum 2 to form an electrostatic latent image thereon, disposed in this order from upstream to downstream in the direction of the rotation in the vicinity of the photosensitive drum 2.

The rotary developing apparatus (III) includes a rotatably disposed housing (hereinafter called "rotating member") 18, and a yellow developing unit 18Y, a magenta developing unit 18M, a cyan developing unit 18C and a black developing unit 18BK respectively disposed within the rotating member 18 so as to visualize an electrostatic latent image formed on the outer periphery of the photosensitive drum 2 when placed at a position facing the outer surface of the photosensitive member 2.

A sequence of the operation of the image forming apparatus having an arrangement as described above will now be explained with respect to a full-color mode. When the photosensitive drum 2 is rotated in the arrow direction in FIG. 7, the photoconductor on the drum 2 is uniformly charged by the primary charger 3 and then subjected to imagewise exposure with laser light E modulated by a yellow image signal based on an original (not shown) to form an electrophotographic latent image on the photosensitive drum 2, which is then developed by the yellow developing unit 18Y which has been placed at the developing position facing the photosensitive drum 2 by the rotation of the rotation member 18.

On the other hand, a recording medium conveyed through the supply guide 4A, supply roller 106 and supply roller 4B is held by the gripper 6 at a prescribed time and wound about the transfer drum 8 electrostatically by the abutting roller 7 and an electrode disposed opposite to the roller 7. The transfer drum 8 is rotated in the arrow direction synchronously with the photosensitive drum 2, and the developed image on the photosensitive drum 2 given by the yellow developing unit 18Y is transferred onto the recording medium at a place where the photosensitive drum 2 and the transfer drum 8 abut each other. The transfer drum 8 is further rotated so as to be ready for transfer of a subsequent color ("magenta" in the case shown in FIG. 7).

The photosensitive drum is then charge-removed by the charge-removing charger 10, cleaned by the cleaning means 11, again charged by the primary charger 3 and then subjected to imagewise exposure based on a magenta image signal in the same manner as in the yellow exposure described above. During such electrostatic latent image formation on the photosensitive drum 2 based on the magenta image signal, the rotating member 18 is rotated so that the magenta developing unit 18M is disposed at the above-mentioned prescribed developing position. Then, a prescribed magenta developing operation is performed and the developed magenta image is transferred onto the recording medium already carrying the yellow image on the transfer drum 8 in the same manner as in the yellow development.

The above operation is repeated also with respect to a cyan color and a black color. After transfer of the four color images, a multi-color image is formed on the recording medium on the transfer drum 8, charge-removed with the respective chargers 12 and 13. Then, the recording medium carrying the multi-color image is released from the gripper 6, separated from the transfer drum 8 by the separation claw 14 and conveyed by the conveyer belt 15 to the fixer 16, where the multi-color image is fixed onto the recording medium under heat and pressure. In this way, one full-color print sequence is completed to provide a prescribed full-color print image.

The fixer 16 includes a hot fixing roller 161 and a pressing roller 162. The hot roller 161 may preferably be covered with a surface layer of, e.g., silicone rubber or fluorine-containing resin, having an excellent releasability. The pressing roller 162 may preferably be surfaced with a fluorine-containing resin.

According to the present invention, in an image forming sequence as described above, a laminate film having a wax-absorbing layer is used as the recording medium. As a result, even when a toner containing a wax component is used to form a fixed toner image thereon, exudation of the wax causing wax flowout is prevented on the fixed toner image. Further, as the fixation is satisfactorily performed without oil applications deterioration of the fixed image or the laminate film is avoided. Accordingly, fixed images of a good quality can be formed on the laminate film suitable for OHP use. More specifically, the fixed image formed on the laminate film provides a color or full-color projected image which is free from graying as a whole and shows a good color reproducibility.

Hereinbelow, the present invention is described more specifically based on Examples, wherein "part(s)" means "part(s) by weight".

EXAMPLE 1

451 wt. parts of 0.1M-$Na_3PO_4$ aqueous solution was added to 7–9 wt. parts of deionized water, followed by warming at 60° C. and stirring by a TK homomixer (mfd. by Tokushu Kika Kogyo K.K.) at 12,000 rpm. Then, 67.7 wt. parts of 1.0M-$CaCl_2$ aqueous solution was gradually added thereto to form a dispersion medium containing $Ca_3(PO_4)_2$.

| | |
|---|---|
| Styrene | 170 wt. parts |
| 2-Ethylhexyl acrylate | 30 wt. parts |
| Paraffin wax (Tmp = 75° C.) | 60 wt. parts |
| C.I. Pigment Blue 15 | 10 wt. parts |
| Styrene-methacrylic acid-methyl methacrylate copolymer | 5 wt. parts |
| Di-tert-butylsalicylic acid metal compound | 3 wt. parts |

Of the above-listed ingredients, only C. I. Pigment Blue 15, di-tert-butyl salicylic acid metal compound and styrene were subjected to preliminary mixing by a mixer ("Ebara Milder", mfd. by Ebara Seisakusho K.K.). Then, the remaining ingredients were added, and the entire mixture was warmed at 60° C. and dissolved and dispersed with each other to form a monomer mixture. Then, while the mixture was held at 60° C., 10 parts of dimethyl 2,2'-azobisisobutyrate (initiator) was added thereto to form a monomer composition.

Into the above-prepared dispersion medium under stirring in a 2 liter-flask, the above monomer composition was added and dispersed into particles under stirring by the TK homomixer at 10000 rpm for 20 min. at 60° C. in a nitrogen atmosphere. Then, the content was stirred by a paddle stirrer for 3 hours of reaction at 60° C. and 10 hours of polymerization at 80° C.

After the polymerization, the product was cooled, acidified with hydrochloric acid to dissolve $Ca_3(PO_4)_2$, recovered by filtration, washed with water and dried to obtain a polymerization toner.

The thus-obtained toner was found to have a weight-average particle size of 8.2 microns and a sharp particle size distribution as measured by a Coulter counter. A particle section was observed by a transmission electron microscope by stained ultramicrotomy, whereby a capsule structure having a surface layer consisting mainly of the styrene-acrylic resin and a core consisting mainly of the wax was observed.

0.7 wt. part of hydrophobic silica having a BET specific surface area of 200 $m^2/g$ was externally added to 100 wt. parts of the toner. Further, 7 wt. parts of the toner was mixed with 93 wt. parts of a Cu—Zn—Fe type ferrite carrier surface-coated with styrene-methyl methacrylate copolymer to obtain a developer.

The developer was charged in a re-modeled commercially available full-color copying machine ("CLC-500", mfd. by Canon K.K.) and used to form an image on a laminate film as a recording medium prepared in the following manner under developing conditions including environmental temperature of 23° C. and humidity of 65% RH and a developing contrast of 320 volts.

The laminate film used was a laminate film A prepared by coating an about 100 micron-thick PET film with an absorbing layer formed by CVD (chemical vapor deposition) in a known manner of inorganic fine powder comprising aluminum as a principal element. The laminate film A showed an average pore radius of 32 Å and a BET specific surface area of 7 $m^2/g$.

A yet-unfixed toner image on the laminate film formed by development and transfer in the remodeled copying machine ("CLC-500") was fixed by passing through an external fixing machine (having the same roller arrangement as the one in the "CLC-500" copying machine but having no oil applicator) at a fixing speed of 20 mm/sec.

As a result, a fixed toner image was formed without causing offset, in the form of a beautiful and clear transparent image free from exudation or flowout trace of the wax component. The fixed toner image was used for projection by an OHP apparatus to provide a very beautiful cyan-colored projected image.

EXAMPLE 2

A laminate film B was prepared in the same manner as in Example 1 except that a wax-absorbing layer was formed by replacing the inorganic fine powder with silica-type inorganic fine powder. The wax-absorbing layer of the laminate film B showed an average pore radius of 55 Å and a BET specific surface area of 11 $m^2/g$.

As a result of image formation on the laminate film B otherwise in the same manner as in Example 1, a good fixed image was formed without any exudation trace of the wax component. As a result of projection of the image by an OHP apparatus, a beautiful projection image was obtained without impairing the transparency.

EXAMPLE 3

The toner production process in Example 1 was repeated except that the C. I. Pigment Blue 15 was replaced with 9 parts of C. I. Pigment Red 122 to prepare a magenta toner, with 8 parts of C. I. Pigment Yellow to prepare a yellow toner, and with 12 parts of commercially available carbon black to prepare a black toner.

Three developers were prepared by using these three colors of toners in the same manner as in Example 1, and 4 colors of developers including the blue developer used in Example 1 were used to form a yet un-fixed full-color toner image on a laminate film A as used in Example 1 by development and transfer in the re-modeled copying machine ("CLC-500"). The full-color toner image was fixed by an external fixing machine equipped with a pressure roller of a silicone rubber and without oil application.

The resultant fixed toner image was free of offset or exudation trace of the wax component, thus being excellent in quality.

The transparent film carrying the toner image was used for projection by an OHP apparatus to provide a beautiful full-color projection image. Further, the transparent film was obtained through fixation without oil application, so that it was free from stickiness and excellent in storage stability.

EXAMPLE 4

A laminate film C was prepared by coating an about 100 micron-thick PET film with a coating liquid prepared by mixing 90 parts of alumina hydrate and 10 parts of polyvinyl alcohol with 1000 parts of water by bar coating, followed by drying at 150° C. for 10 min. in a drying oven to form an 8 micron-thick wax absorbing layer. The wax absorbing layer of the laminate film C showed an average pore radius of 50 Å and a BET specific surface area of 10 $m^2/g$. Image formation and fixation was performed by using the laminate film C otherwise in the same manner as in Example 1, whereby a good fixed toner image was obtained free from exudation trace of wax component. As a result of projection by an OHP apparatus, a beautiful projection image was obtained without impairing transparency.

COMPARATIVE EXAMPLE 1

Development, transfer and fixation of a toner image were performed by using a commercially available OHP film (a corona discharged polyethylene terephthalate film) in place of the laminate film A otherwise in the same manner as in Example 1. As a result, no offset was caused due to the effect of the wax contained in the toner, but a wax exudation trace was observed at a rear end of the image and the image was accompanied with a low transparency as a whole.

EXAMPLE 5

A laminate film D was prepared in the same manner as the laminate film A except that the amount of the inorganic fine powder was reduced to have a specific surface area of 0.08 $m^2/g$.

Development, transfer and fixation of a toner image were performed by using the laminate film D otherwise in the same manner as in Example 1. No offset was caused but there was observed a slight trace of wax exudation which was, however within a practically acceptable extent.

EXAMPLE 6

| | |
|---|---|
| Styrene-butyl acrylate copolymer | 100 parts |
| Low-molecular weight polyolefin wax | 7 parts |
| Phthalocyanine pigment | 4.5 parts |
| Di-tert-butylsalicylic acid metal compound | 3 parts |

The above ingredients were blended, melt-kneaded by a twin-screw kneading extruder, cooled and then pulverized by a jet stream pulverizer, followed by classification by a pneumatic classifier to obtain a blue powdery toner having a weight-average particle size of 8.5 microns. Then, 100 parts of the toner was blended with 0.8 wt. part of negatively chargeable colloidal silica externally added thereto to obtain a cyan toner, which was then blended with ferrite particles coated with a fluorine-containing acrylic resin in a ratio of 1:9 to obtain a blue developer.

A yet-unfixed toner image was formed on the laminate film A used in Example 1 by using the above-prepared blue developer and the remodeled copying machine ("CLC-500"), and then fixed by an external fixing machine comprising an upper roller coated with a fluorine-containing resin and a lower silicone rubber roller but having no oil applicator, whereby a fixed image with a good transparency and no wax exudation trace was obtained without causing offset.

EXAMPLE 7

A laminate film E was prepared by coating an about 100 micron-thick PET film with a film of silica formed by CVD and found to have an average pore radius of 26 Å and a BET specific surface area of 12 $m^2/g$. Image formation and fixation were performed by using the laminate film E otherwise in the same manner as in Example 6, whereby a fixed toner image with a good transparency and with no wax exudation trace was obtained without causing offset.

EXAMPLE 8

| | |
|---|---|
| Polyester | 100 parts |
| Paraffin wax | 9 parts |
| Phthalocyanine pigment | 4.5 parts |
| Di-tert-butylsalicylic acid compound | 3 parts |

The above ingredients were subjected to melt-kneading, pulverization, classification, external addition of silica and blending with carrier in the same manner as in Example 6 to prepare a blue developer.

A yet-unfixed toner image was formed and fixed on the laminate film A by using the blue developer otherwise in the same manner as in Example 6, whereby a fixed toner image with excellent transparency was obtained without no wax exudation trace.

EXAMPLE 9

Image formation and fixation were performed in the same manner as in Example 6 except for using the laminate film C used in Example 4 instead of the laminate film A, whereby a fixed image with a good transparency and no wax exudation trace was formed without causing offset.

COMPARATIVE EXAMPLE 2

A blue developer was prepared in the same manner as in Example 6 except for omission of the wax component, and used for image formation and fixation in the same manner as in Example 6, whereby offset was caused, thus failing to provide a good fixed toner image.

EXAMPLE 10

A laminate film F having a BET specific surface area of 0.09 $m^2/g$ was prepared in a manner similar to the laminate film A used in Example 6 by changing the conditions for forming the absorbing layer.

Image formation and fixation were performed on the laminate film thus formed otherwise in the same manner as in Example 6, whereby the resultant fixed toner image showed a somewhat lower transparency which was however at a practically acceptable level.

EXAMPLE 11

A biaxially stretched 100 micron-thick polyethylene terephthalate (PET) film having a heat distortion temperature of 152° C. and a maximum service temperature of 150° C. was coated with a 16 micron-thick transparent resin layer formed by applying a solution in acetone of a polyester resin (solubility parameter: about 11) having a storage modulus (G') of $8\times10^4$ dyn/$cm^2$ at a temperature of 160° C. and a frequency (W) of 100 rad/sec and a softening point of 116° C. by bar coating, followed by drying, and then with a wax-absorbing layer formed in the same manner as in Example 1, to form a laminate film G.

Separately, a yellow toner powder was prepared by using 100 parts of a polyester resin $P_2$ (solubility parameter: about 11) having a storage modulus (G') of $4\times10^3$ dyn/$cm^2$ at a temperature of 160° C. and a frequency (W) of 100 rad/sec and a softening point of 105° C., 9 parts of paraffin wax, 3.5 parts of yellow colorant and 4 parts of a chromium-containing organocomplex. The yellow toner powder showed a volume-average particle size of 12 microns, a storage modulus (G') of $8\times10^3$ dyn/$cm^2$ and a softening point of 107° C.

Then, 0.4 part of hydrophobic colloidal silica was externally added to 100 parts of the yellow toner powder to form a yellow toner, which was then mixed with ferrite particles in a weight ratio of 5:100 to obtain a yellow developer.

A uniform yet unfixed yellow toner image was formed on the above-prepared laminate film G by using the above yellow developer and image formation and transfer and then fixed in an image forming apparatus as shown in FIG. 7 equipped with a hot pressure fixer including a hot fixing roller 161 surfaced with silicone rubber and a pressure roller 162 surfaced with a fluorine-containing resin under the fixing conditions of a hot fixing roller temperature of 160° C., an average heating time of 25 msec and a pressing force of 3 kg/$cm^2$ to form a fixed yellow toner image having an image density (McBeth refractive densitometer) of 1.5.

The thus obtained fixed toner image showed no offset and was clear and free from wax exudation trace. When the toner image was projected by an OHP, a very clear yellow transmitted light was obtained to provide a beautiful yellow projected image.

EXAMPLE 12

A magenta toner powder having a volume-average particle size of 12 microns was prepared in the same manner as in Example 11 except for using 1.9 parts of a magenta colorant. The magenta toner powder showed a storage modulus of $6\times10^3$ dyn/$cm^2$.

A red developer was prepared by using the magenta toner powder otherwise in the same manner as in Example 11 and then used for image formation and fixation on the laminate film G in the same manner as in Example 11. The resultant fixed image caused no offset and was clear and free from wax exudation trace. When used for projection by an OHP apparatus, the fixed toner image provided very clear red transmitted light and also a beautiful red projected image.

EXAMPLE 13

A cyan toner powder having a volume-average particle size of 12 microns was prepared in the same manner as in Example 11 except for using 5.0 parts of a cyan colorant. The magenta toner powder showed a storage modulus of $1\times10^4$ dyn/$cm^2$ and a softening point of 108° C.

A blue developer was prepared by using the magenta toner otherwise in the same manner as in Example 11 and then used for image formation and fixation on the laminate film G in the same manner as in Example 11. The resultant fixed image caused no offset and was clear and free from wax exudation trace. When used for projection by an OHP apparatus, the fixed toner image provided very clear blue transmitted light and also a beautiful blue projected image.

EXAMPLE 14

A laminate film H was prepared in the same manner as in the laminate film G used in Example 11 except that the absorbing layer was replaced by an 8 micron-thick absorbing layer comprising alumina and polyvinyl alcohol prepared in the same manner as in Example 4.

Image formation and fixation were performed on the laminate film H otherwise in the same manner as in Example 11, whereby a clear fixed toner image free from wax exudation trace was obtained without offset. When projected by an OHP, the toner image provided a very beautiful yellow transmitted light and also a beautiful yellow projection image.

EXAMPLE 15

A PET film as used in Example 11 was coated with a methyl ethyl ketone solution of an epoxy resin having a solubility parameter of 10.5, a weight-average molecular weight (Mw) of 20,000, a storage modulus (G') of $5\times10^4$ dyn/$cm^2$ and a softening point of 114° C., followed by drying to form a 15 micron-thick transparent resin layer, and then coated with an absorbing layer formed in the same manner as in Example 1.

Image formation and fixation were performed on the laminate film I so as to provide a fixed toner image having an image density of 0.5 otherwise in the same manner as in Example 11. The resultant fixed toner image was clear, offset-free and also free from wax exudation trace. When projected by an OHP apparatus, the toner image provided a very clear yellow transmitted light and also a beautiful yellow projected image.

EXAMPLE 16

A fixed magenta toner image was formed on the laminate film I in the same manner as in Example 15 except for using the magenta toner prepared in Example 12 so as to provide a fixed image density of 0.5.

The resultant fixed toner image was clear, offset-free and also free from wax exudation trace. When projected by an OHP apparatus, the toner image provided a very clear red transmitted light and also a beautiful red projection image.

EXAMPLE 17

A fixed cyan toner image was formed on the laminate film I in the same manner as in Example 15 except for using the cyan toner prepared in Example 13 so as to provide a fixed image density of 0.5.

The resultant fixed toner image was clear, offset-free and also free from wax exudation trace. When projected by an OHP apparatus, the toner image provided a very clear blue transmitted light and also a beautiful blue projection image.

EXAMPLES 18–20

Yellow fixed toner image, magenta fixed toner image and cyan fixed toner image were each formed on a laminate film G having a transparent resin layer of a polyester resin as used in Example 11 otherwise in the same manner as in Examples 15–17, respectively. The thus obtained fixed toner images provided further better transmittances than in Examples 15–17 because of the transparent layer comprising a polyester resin of the same kind as %he toner binder resin.

EXAMPLE 21

A yellow fixed toner image having an image density of 0.5 was formed on the laminate film H used in Example 14 having a transparent layer of a polyester resin and a wax-absorbing layer comprising alumina particles and polyvinyl alcohol otherwise in the same manner as in Example 15. The toner image provided a further better transmittance than in Example 15 because the laminate film H had a transparent resin layer comprising a polyester resin of the same kind as the toner binder resin.

EXAMPLE 22

A sharp-melting polyester resin prepared by condensation polymerization of propoxide hisphenol and fumaric acid and showing properties shown in the following Table 1 was used as a toner binder resin.

TABLE 1

| Storage modulus (G') at 160° C. and 100 rad/sec | Softening point | Solubility parameter |
|---|---|---|
| 7 × 10 | 106° C. | about 11 |

100 parts of the above polyester resin and materials shown in Table 2 below were used to prepare toner powder of respective colors.

TABLE 2

| Toner | Colorant | Qty. (parts) | Charge controller | Qty. (parts) |
|---|---|---|---|---|
| Yellow | C.I. Pigment Yellow 17 | 3.5 | Organochromium complex | 4.0 |
| Magenta | C.I. Solvent Red 52 | 1.0 | Organochromium complex | 4.0 |
| | C.I. Solvent Red 49 | 0.9 | | |
| Cyan | Phthalocyanine pigment | 5.0 | Organochromium complex | 4.4 |
| Black | C.I. Pigment Yellow 17 | 1.2 | Organochromium complex | 4.4 |
| | C.I. Pigment Red 5 | 2.8 | | |
| | C.I. Pigment Blue 15 | | | |

Toner powder of the respective colors showed properties given in Table 3 below.

TABLE 3

| Toner | Storage modulus (G') at 160° C., 100 rad/sec | Softening point |
|---|---|---|
| Yellow | $1 \times 10^4$ dyn/cm$^2$ | 109° C. |
| Magenta | $8 \times 10^3$ | 108 |
| Cyan | $1 \times 10^4$ | 109 |
| Black | $1 \times 10^4$ | 109 |

100 parts each of the toner powders of respective colors were respectively mixed externally with 0.5 part of hydrophobic colloidal silica to form respectively color toners, which were then respectively mixed with a resin-coated ferrite carrier in a weight ratio of 5:100 to provide respective colors of developers. The four colors of developers were charged in an image forming apparatus as shown in FIG. 7, and were used for image formation repeatedly on the laminate film G and respectively in the same manner as in Example 11, followed by fixing in the same manner as in Example 11, to form a full-color fixed toner image thereon. The laminate film carrying the full-color fixed toner image was used for projection by an OHP apparatus, whereby a brilliant full-color projection image was formed on a screen and no wax exudation trace was observed.

EXAMPLE 23

Image formation and fixation were performed to form a full-color fixed toner image on the laminate film H used in Example 14 instead of the laminate film G otherwise in the same manner as in Example 22. When used for projection by an OHP apparatus, the full-color fixed toner image provided a brilliant full color image when projected on a screen and no wax exudation trace was observed.

EXAMPLE 24

A laminate film J was prepared by replacing the transparent resin layer of a polyester resin of the laminate film G with a 16 micron-thick layer of the polyester resin used as the binder resin in Example 16. A full-color toner image was formed on the laminate film J by using the yellow toner, magenta toner, cyan toner and black toner in the same manner as in Example 16, and the toner image was fixed to cause color mixing under the conditions of a hot fixing roller temperature of 160° C., an average heating time of 25 msec and a pressing force of 3 kg/cm$^2$, whereby a full-color fixed image free from wax exudation trace was formed without offset.

What is claimed is:

1. A laminate film for receiving a toner image formed by a toner including a binder resin, a colorant and a wax component, the laminate film comprising:

an absorbing layer for absorbing a wax component of a toner image; and a substrate supporting the absorbing layer;

wherein the absorbing layer comprises inorganic powder and a resin for holding the inorganic powder in an inorganic powder-to-resin weight ratio of about 9:1 to 50:1, wherein the absorbing layer has an average pore radius of 10 to 200 Å, and wherein said laminate film has a BET specific surface area of 7 to 30 m$^2$/g.

2. The laminate film according to claim 1, further comprising a toner image thereon containing a wax component contained in a polymerization toner obtained through suspension polymerization.

3. The laminate film according to claim 1, further comprising a toner image thereon containing a wax component contained in a toner prepared through melt-kneading, pulverization and classification of toner ingredients including the wax component.

4. The laminate film according to claim 1, further comprising a toner image thereon containing a wax component having a melting point of 30°–150° C.

5. The laminate film according to claim 1, further comprising a toner image thereon containing a wax component having a melting enthalpy of 50–250 Joule/g.

6. The laminate film according to claim 1, wherein the inorganic powder comprises a constituent selected from the group consisting of activated alumina, aluminum hydroxide, alumina hydrate, silica or titanium oxide.

7. The laminate film according to claim 1, wherein the resin comprises polyvinyl alcohol and the inorganic powder comprises alumina hydrate, respectively, in the absorbing layer.

8. The laminate film according to claim 1, wherein the inorganic powder has an average primary particle size of 0.001–0.1 micron.

9. The laminate film according to claim 1, wherein the absorbing layer comprises the inorganic powder and the resin in a weight ratio of about 9:1 to 20:1.

10. The laminate film according to claim 1, wherein the absorbing layer is disposed on the substrate, the substrate being surface-treated by plasma or corona discharge.

11. The laminate film according to claim 1, further comprising an intermediate adhesive layer positioned between the absorbing layer and the substrate.

12. The laminate film according to claim 11, wherein the intermediate adhesive layer comprises a member selected from the group consisting of polyester resin, acrylic resin, methacrylate resin, styrene-acrylate copolymer and styrene-methacrylate copolymer.

13. The laminate film according to claim 1, further comprising an intermediate transparent resin layer positioned between the absorbing layer and the substrate.

14. The laminate film according to claim 13, wherein the intermediate transparent resin layer comprises a transparent resin having a solubility parameter of 9.5–12.5 and a storage modulus (G') of $1\times10^3$–$1\times10^6$ dyn/cm$^2$ as measured at a temperature of 160° C. and a frequency (w) of 100 rad/sec.

15. The laminate film according to claim 13, wherein when a toner has a storage modulus (G'), the transparent resin layer comprises a resin having a storage modulus (G') larger than the storage modulus (G') of the toner, each as measured at a temperature of 160° C. and a frequency (w) of 100 rad/sec.

16. The laminate film according to claim 13, wherein the inorganic powder comprises a constituent selected from the group consisting of activated alumina, aluminum hydroxide, alumina hydrate, silica and titanium oxide.

17. The laminate film according to claim 13, wherein the resin comprises polyvinyl alcohol and the inorganic powder comprises alumina hydrate, respectively, in the absorbing layer.

18. The laminate film according to claim 13, wherein the inorganic powder has an average primary particle size of 0.001–0.1 micron.

19. The laminate film according to claim 13, wherein the absorbing layer comprises the inorganic powder and the resin in a weight ratio of about 9:1 to 20:1.

20. The laminate film according to claim 13, wherein the absorbing layer is disposed on the transparent resin layer, the transparent resin layer being surface-treated by plasma or corona discharge.

21. The laminate film according to claim 13, further comprising an intermediate adhesive layer positioned between the intermediate transparent resin layer and the substrate.

22. The laminate film according to claim 21, wherein the intermediate adhesive layer comprises a member selected from the group consisting of polyester resin, acrylic resin, methacrylate resin, styrene-acrylate copolymer and styrene-methacrylate copolymer.

23. The laminate film according to claim 13, wherein the intermediate transparent resin layer is disposed on the substrate, the substrate being surface-treated by plasma or corona discharge.

24. The laminate film according to claim 1, wherein the resin in the absorbing layer comprises a transparent resin having a solubility parameter of 9.5–12.5 and a storage modulus (G') of $1\times10^3$–$1\times10^6$ dyn/cm$^2$ as measured at a temperature of 160° C. and a frequency (w) of 100 rad/sec.

25. The laminate film according to claim 24, wherein the inorganic powder comprises a constituent selected from the group consisting of activated alumina, aluminum hydroxide, alumina hydrate, silica or titanium oxide.

26. The laminate film according to claim 24, wherein the absorbing layer is disposed on the substrate, the substrate being surface-treated by plasma or corona discharge.

27. The laminate film according to claim 24, further comprising an intermediate adhesive layer positioned between the absorbing layer and the substrate.

28. The laminate film according to claim 27, wherein the intermediate adhesive layer comprises a member selected from the group consisting of polyester resin, acrylic resin, methacrylate resin, styrene-acrylate copolymer and styrene-methacrylate copolymer.

29. The laminate film according to claim 1, wherein when a toner has a storage modulus (G'), the absorbing layer comprises a transparent resin having a storage modulus (G') larger than the storage modulus (G') of the toner, each as measured at a temperature of 160° C. and a frequency (w) of 100 rad/sec.

30. The laminate film according to claim 1, further comprising a color toner image.

31. The laminate film according to claim 1, further comprising a full-color toner image.

32. The laminate film according to claim 1, wherein said substrate has a thickness of 50–300 μm.

33. The laminate film according to claim 1, wherein the laminate film is formed by applying a coating liquid comprising said resin, said inorganic powder and a solvent.

34. The laminate film according to claim 1, wherein the absorbing layer is formed by applying a coating liquid containing at least the resin and the inorganic powder.

35. A laminate film for receiving a toner image formed by a toner comprising a binder resin, a colorant and a wax component, obtained through suspension polymerization, said laminate film comprising:

an absorbing layer for absorbing a wax component of a toner image; and a substrate for supporting the absorbing layer;

wherein the absorbing layer is a layer formed by a dry coating of inorganic powder, whereby the absorbing layer consists essentially of the inorganic powder, the absorbing layer has an average pore radius of 10 to 200 Å, and said laminate film has a BET specific surface area of 7 to 30 m$^2$/g.

36. The laminate film according to claim 35, wherein said substrate has a thickness of 50–300 μm.

37. The laminate film according to claim 35, further comprising a toner image thereon containing a wax component having a melting point of 30°–150° C.

38. The laminate film according to claim 35, further comprising a toner image thereon containing a wax component having a melting enthalpy of 50–250 Joule/g.

39. The laminate film according to claim 35, wherein the inorganic powder comprises a constituent selected from the group consisting of activated alumina, aluminum hydroxide, alumina hydrate, silica or titanium oxide.

40. The laminate film according to claim 35, wherein the absorbing layer is disposed on the substrate, the substrate being surface-treated by plasma or corona discharge.

41. The laminate film according to claim 35, further comprising an intermediate adhesive layer positioned between the absorbing layer and the substrate.

42. The laminate film according to claim 41, wherein the intermediate adhesive layer comprises a member selected from the group consisting of polyester resin, acrylic resin, methacrylate resin, styrene-acrylate copolymer and styrene-methacrylate copolymer.

43. The laminate film according to claim 35, further comprising an intermediate transparent resin layer positioned between the absorbing layer and the substrate.

44. The laminate film according to claim 43, wherein the intermediate transparent resin layer comprises a transparent resin having a solubility parameter of 9.5–12.5 and a storage modulus (G') of $1\times10^3$–$1\times10^6$ dyn/cm$^2$ as measured at a temperature of 160° C. and a frequency (w) of 100 rad/sec.

45. The laminate film according to claim 43, wherein when a toner has a storage modulus (G'), the transparent resin layer comprises a transparent resin having a storage modulus (G') larger than the storage modulus (G') of the toner, each as measured at a temperature of 160° C. and a frequency (w) of 100 rad/sec.

46. The laminate film according to claim 35, further comprising a color toner image.

47. The laminate film according to claim 35, further comprising a full-color toner image.

48. A laminate film for receiving a toner image formed by a toner comprising a binder resin, a colorant and a wax component prepared through melt-kneading, pulverization and classification, said laminate film comprising:

an absorbing layer for absorbing a wax component of a toner image; and a substrate supporting the absorbing layer;

wherein the absorbing layer is a layer formed by a dry coating of inorganic powder, whereby the absorbing layer consists essentially of the inorganic powder, the absorbing layer has an average pore radius of 10 to 200 Å, and said laminate film has a BET specific surface area of 7 to 30 m$^2$/g.

49. The laminate film according to claim 48, wherein said substrate has a thickness of 50–300 μm.

50. The laminate film according to claim 48, further comprising a toner image thereon containing a wax component having a melting point of 30°–150° C.

51. The laminate film according to claim 48, further comprising a toner image thereon containing a wax component having a melting enthalpy of 50–250 Joule/g.

52. The laminate film according to claim 48, wherein the inorganic powder comprises a constituent selected from the group consisting of activated alumina, aluminum hydroxide, alumina hydrate, silica and titanium oxide.

53. The laminate film according to claim 48, wherein the absorbing layer is disposed on the substrate, the substrate being surface-treated by plasma or corona discharge.

54. The laminate film according to claim 48, further comprising an intermediate adhesive layer positioned between the absorbing layer and the substrate.

55. The laminate film according to claim 54, wherein the intermediate adhesive layer comprises a member selected from the group consisting of polyester resin, acrylic resin, methacrylate resin, styrene-acrylate copolymer and styrene-methacrylate copolymer.

56. The laminate film according to claim 48, further comprising an intermediate transparent resin layer positioned between the absorbing layer and the substrate.

57. The laminate film according to claim 56, wherein the intermediate transparent resin layer comprises a transparent resin having a solubility parameter of 9.5–12.5 and a storage modulus (G') of $1\times10^3$–$1\times10^6$ dyn/$cm^2$ as measured at a temperature of 160° C. and a frequency (w) of 100 rad/sec.

58. The laminate film according to claim 56, wherein the transparent resin layer comprises a transparent resin having a storage modulus (G') larger than a storage modulus (G') of the toner, each as measured at a temperature of 160° C. and a frequency (w) of 100 rad/sec.

59. An image sheet, comprising:

a toner image formed by a toner comprising a binder resin, a colorant, and a wax component having a melting point of 30°–150° C.; and a laminate film carrying the toner image, said laminate film comprising an absorbing layer for absorbing the wax component of the toner image, and a substrate supporting the absorbing layer, the absorbing layer comprising inorganic powder and having an average pore radius of 10–200 Å.

60. The image sheet according to claim 59, wherein the absorbing layer comprises inorganic powder and a resin for holding the inorganic powder in an inorganic powder-to-resin weight ratio of about 9:1 to 50:1, and said laminate film has a BET specific surface area of 7 to 30 $m^2$/g.

* * * * *

UNITED STATES PATENT AND TRADEMARK OFFICE

CERTIFICATE OF CORRECTION

PATENT NO. : 5,582,902 Page 1 of 3

DATED : December 10, 1996

INVENTOR(S) : MAKOTO KANBAYASHI, ET AL.

It is certified that error appears in the above-indentified patent and that said Letters Patent is hereby corrected as shown below:

Title page, item

[56] References Cited:

FOREIGN PATENT DOCUMENTS

"1/1990" should read --3/1990--.

COLUMN 1:

Line 49, "highly" should read --high--.
Line 57, "a" should read --with a--.

COLUMN 2:

Line 53, "Specifically" should read --Specifically,--.

COLUMN 5:

Line 5, "embodiment" should read --embodiments--.
Line 28, "with" should read --to--.
Line 37, "turbid to result" should read --turbid, resulting--.

COLUMN 6:

Line 63, "Explanation is made on" should read --An explanation will be made of--.

COLUMN 9:

Line 7, "Molybdenun" should read --Molybdenum--.

UNITED STATES PATENT AND TRADEMARK OFFICE

CERTIFICATE OF CORRECTION

PATENT NO. : 5,582,902

DATED : December 10, 1996

INVENTOR(S) : MAKOTO KANBAYASHI, ET AL.

It is certified that error appears in the above-indentified patent and that said Letters Patent is hereby corrected as shown below:

COLUMN 11:

Line 33, "133 $10^3$" should read --1 x $10^3$--.

COLUMN 12:

Line 29, "with" should read --to--.

COLUMN 13:

Line 29, "in" should read --In the--.
Line 39, delete "5".

COLUMN 14:

Line 22, "as" should read --such as--.

COLUMN 16:

Line 62, "liter-flask" should read --liter flask--.

COLUMN 18:

Line 46, "with" should read --by--.
Line 57, "extent." should read --range.--.

COLUMN 19:

Line 58, "without" should read --with--.

UNITED STATES PATENT AND TRADEMARK OFFICE

CERTIFICATE OF CORRECTION

PATENT NO. : 5,582,902

DATED : December 10, 1996

INVENTOR(S) : MAKOTO KANBAYASHI, ET AL.

It is certified that error appears in the above-indentified patent and that said Letters Patent is hereby corrected as shown below:

COLUMN 20:

Line 49, "McBeth" should read --MacBeth--.

COLUMN 22:

Line 18, delete "further".
Line 20, "%he" should read --the--.
Line 29, delete "further".

Signed and Sealed this

Third Day of June, 1997

Attest:

BRUCE LEHMAN

Attesting Officer

Commissioner of Patents and Trademarks